United States Patent [19]

Brand

[11] Patent Number: 5,511,598
[45] Date of Patent: Apr. 30, 1996

[54] VENEER-SLICER WITH REMOTELY CONTROLLABLE BLADE ANGLE ADJUSTMENT

[75] Inventor: Robert Brand, Lawrence, Ind.

[73] Assignee: Capital Machine Company, Indianapolis, Ind.

[21] Appl. No.: 223,423

[22] Filed: Apr. 5, 1994

[51] Int. Cl.$^6$ .................................. B27L 5/00; B27B 1/00
[52] U.S. Cl. ..................... 144/356; 144/178; 144/162.R; 364/474.09
[58] Field of Search .............................. 144/162 R, 178, 144/179, 356, 357, 363, 369; 364/474.02, 474.09, 474.34

[56] References Cited

U.S. PATENT DOCUMENTS

| | | | |
|---|---|---|---|
| 793,306 | 6/1905 | Koss . | |
| 2,576,520 | 11/1951 | Koss | 144/178 |
| 2,676,627 | 4/1954 | McFall | 144/178 |
| 3,441,069 | 4/1969 | Koss | 144/389 |
| 3,654,973 | 4/1972 | Koss | 144/178 |
| 4,068,693 | 1/1978 | Cremona | 144/178 |
| 4,069,850 | 1/1978 | Cremona | 144/178 |
| 4,392,519 | 7/1983 | Calvert | 144/356 |
| 4,601,317 | 7/1986 | Brand | 144/178 |
| 5,101,874 | 4/1992 | Weil | 144/209 |
| 5,143,129 | 9/1992 | Toivio | 144/357 |

OTHER PUBLICATIONS

Capital Machine Co., Inc. sales brochure, *Capital Veneer-Making Machines*.
Capital Machine Co., Inc. advertisement for Double Dogging Flitch System.
Parker Fluidpower specification for EH-LDT Actuator With Magnetorestrictive Linear Displacement Transducer.

*Primary Examiner*—W. Donald Bray
*Attorney, Agent, or Firm*—Willian Brinks Hofer Gilson & Lione

[57] ABSTRACT

A veneer-slicing apparatus includes a flitch table movable relative to a carriage which carries a cutting blade for slicing veneer sheets from the flitch. The cutting blade is mounted on a blade carrier that is rotatable relative to the carriage. The apparatus further includes a remotely operable mechanism for adjusting the angle of attack of the cutting blade relative to the flitch by rotating the blade carrier relative to the carriage. The adjusting mechanism includes an electrohydraulic cylinder and piston coupled to the carriage and the cutting blade, a hydraulic fluid flow control valve, a piston position sensor, a computer, and an operator console. All of the components of the adjusting mechanism are electrically coupled to each other. The computer receives operator commands indicating a desired blade angle from the operator console, compares the actual blade angle with the desired blade angle, and actuates the electrohydraulic piston and cylinder, through the hydraulic flow control valve, to change the actual blade angle to the desired blade angle.

28 Claims, 8 Drawing Sheets

VENEER-SLICER WITH REMOTELY CONTROLLABLE BLADE ANGLE ADJUSTMENT

BACKGROUND AND SUMMARY OF THE INVENTION

The present invention relates to veneer-slicers, and particularly to veneer-slicers that have adjustable cutting blades. More particularly, the invention relates to a veneer-slicer with remotely operable adjustable cutting blades, powered actuators for adjusting the cutting blades, and apparatus, remote from the veneer-slicer, to control the actuators.

Veneer-slicing machines are known in the art. See, for example, U.S. Pat. Nos. 793,306; 2,576,520; 3,441,069; and 4,601,317.

Typically, veneer-slicing machines include a carriage for supporting a pressure plate and cutting blade assembly. The carriage is movable in a horizontal plane toward and away from a log, or flitch, to be sliced. The pressure plate and cutting blade assembly includes a blade carrier that is pivotably mounted to the carriage for rotation about a pivot axis that lies parallel to the flitch. The cutting blade is attached to the blade carrier and positioned to present a predetermined angle of attack relative to the flitch to be sliced. The pressure plate is movable relative to the cutting blade to provide a gap between the pressure plate and the cutting blade through which the veneer sheet passes as it is sliced from the flitch.

A flitch support assembly for supporting the flitch moves vertically relative to the carriage and cutting blade. During each downward (or upward) stroke of the flitch, the cutting blade slices a veneer sheet from the flitch. As the flitch is sliced into veneer sheets, the cutting blade becomes dull. Eventually, if the blade becomes dull enough, the machine operator may rotate the cutting blade about the pivot axis to adjust the angle of attack to maintain an improved cutting edge presented to the flitch.

To facilitate adjusting the angle of attack, a pair of adjusting screws are coupled to the carriage and to the blade carrier. The adjusting screws are coupled to the blade carrier at each end of the blade carrier remote from the pivot axis. By turning the screws, the blade carrier is lifted relative to the carriage to rotate the blade carrier and cutting blade about the pivot axis. As the blade rotates about the pivot axis, the angle of attack of the blade changes relative to the flitch. The gap between the pressure plate and cutting blade does not change as the cutting blade is rotated.

Heretofore, an operator had to turn the adjusting screws manually to adjust the angle of attack, which meant that the machine had to be idle for at least as long as it took the worker to get the necessary tools, make the required adjustments, and then get clear of the machine. A blade angle adjusting mechanism that allows a machine operator, positioned remotely from the veneer-slicing machine, to adjust the angle of attack of the cutting blade quickly and accurately and with a minimum of down time on the machine would provide a substantial improvement over conventional manual blade angle adjusting mechanisms.

According to the present invention, a veneer-slicing apparatus comprises a reciprocating flitch table for moving a flitch to be sliced in a substantially vertical plane and a reciprocating carriage movable in a substantially horizontal plane. The reciprocation of the flitch table includes a slicing stroke and a return stroke, and the reciprocation of the carriage includes movement in a first direction toward the plane of reciprocation of the flitch table and movement in a second direction opposite to the first direction. A cutting blade is coupled to the carriage and is oriented to present a predetermined angle of attack relative to the flitch to slice a veneer sheet from the flitch during the slicing stroke of the flitch table.

In accordance with the invention, a remotely operable means for rotating the cutting blade can be operated to alter the angle of attack of the cutting blade relative to the flitch. The rotating means includes remotely controlled and powered positioning means for rotating the cutting blade relative to the flitch, and means, remote from the veneer-slicing apparatus, for controlling the positioning means.

In a preferred embodiment of the invention, the remotely controlled positioning means includes at least one electrohydraulic piston and cylinder, and a fluid source to deliver fluid under pressure, which is controlled to change the position of the piston and adjust the angle of attack of the cutting blade relative to the flitch. The controlling means includes a computer, at least one piston position sensor, at least one hydraulic flow control valve and an operator console electrically coupled to each other. The computer and operator console can be positioned remote from the veneer-slicer. The computer accepts a position indicating signal from the piston position sensor and a command signal from the operator console. The computer processes the signals and sends a control signal to the flow control valve to control the delivery of fluid to the electrohydraulic piston and cylinder to change the position of the piston according to the command signal. The computer also sends another signal to a display to indicate the position of the piston.

By providing at least one electrohydraulic piston and cylinder and control valve, computer, piston position sensor, and operator control console, the present invention provides a reliable improvement to slicing machines that allows an operator to adjust the angle of attack of the cutting blade remotely from the operator console. Thus, the operator no longer need stop the machine and manually turn an adjusting screw, and machine down time is minimized.

Additional objects, features, and advantages of the invention will become apparent to those skilled in the art upon consideration of the following detailed description of preferred embodiments exemplifying the best mode as presently perceived.

BRIEF DESCRIPTION OF THE DRAWINGS

The detailed description particularly refers to the accompanying figures in which.

DETAILED DESCRIPTION OF THE DRAWINGS

Figure 1A:
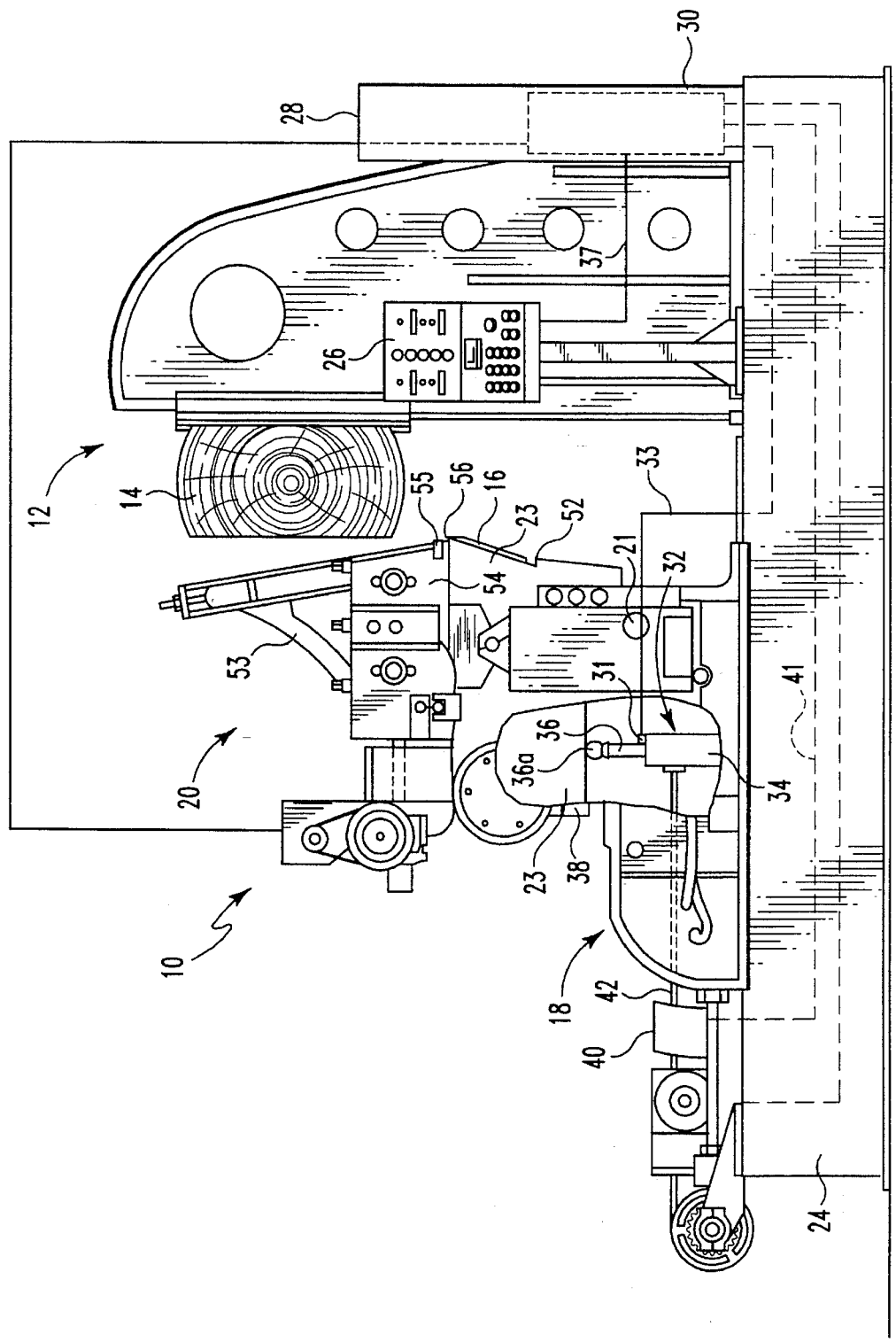
FIG. 1A is side view of veneer-slicing apparatus according to a preferred embodiment of the invention showing a carriage, a pressure plate and cutting blade assembly coupled to a carriage, a flitch table, an operator control console, an electrical cabinet with a computer (in dotted lines) positioned therein, and a fluid source, wherein a portion of the apparatus is cut away to show remotely controllable actuators coupled to the cutting blade assembly and the carriage.

A veneer-slicing system incorporating a presently preferred embodiment of the invention is shown, partially cut away, in FIG. 1. The system comprises a veneer-slicing machine 10 that includes a flitch support assembly 12, a carriage 18, and a pressure plate and cutting blade assembly 20 coupled to the carriage 18. A massive frame 24 supports the veneer-slicing machine 10. Preferably, the frame 24 is embedded in the floor of the factory. A suitable veneer-slicing machine for use with the present invention is fully described in U.S. Pat. No. 4,601,317 issued to Brand on Jul. 22, 1986, the disclosure of which is incorporated herein by reference.

Figure 1B:
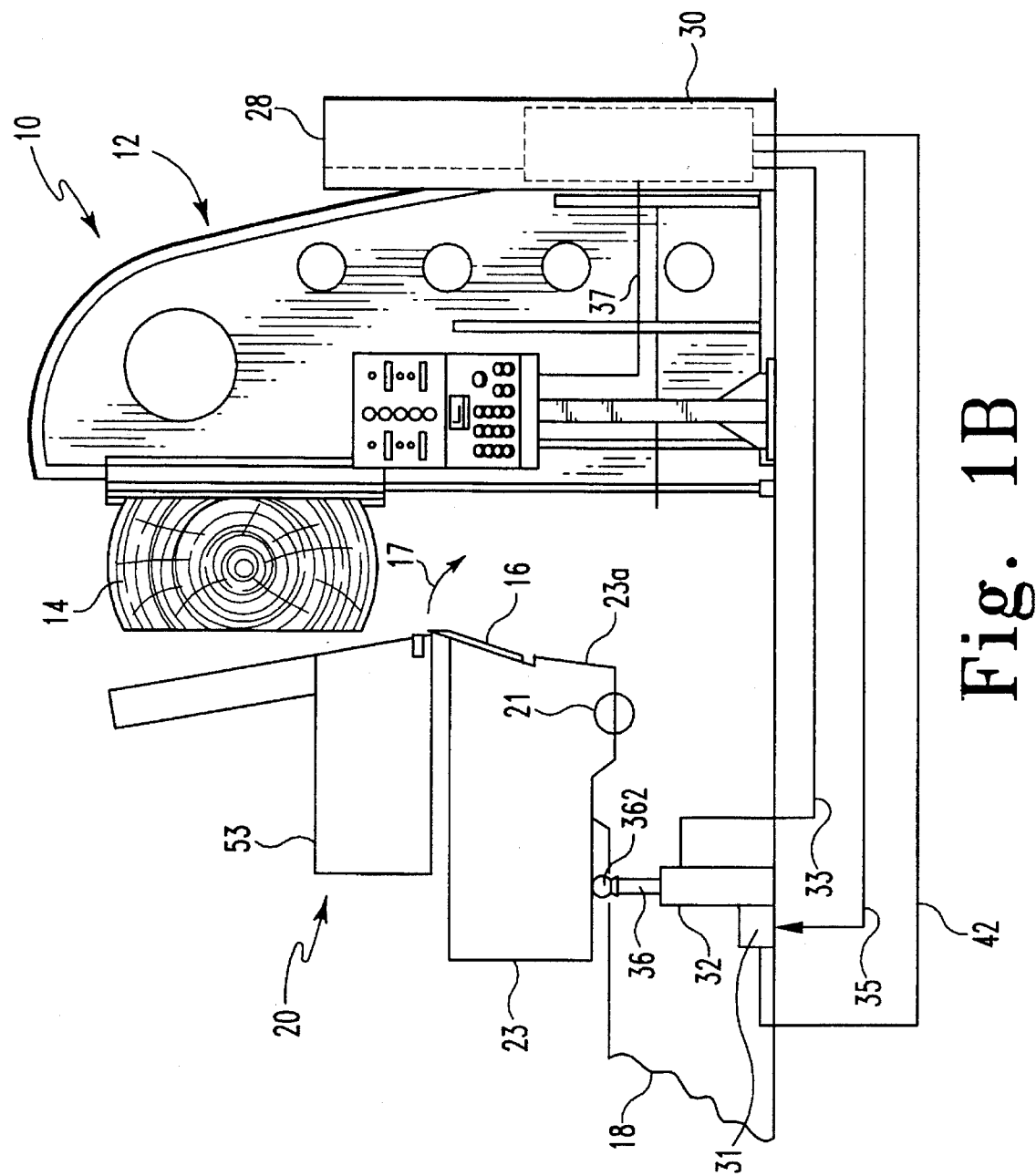
FIG. 1B is a partial diagrammatic drawing of the apparatus of FIG. 1A to simplify illustration of the invention.
Figure 1C:
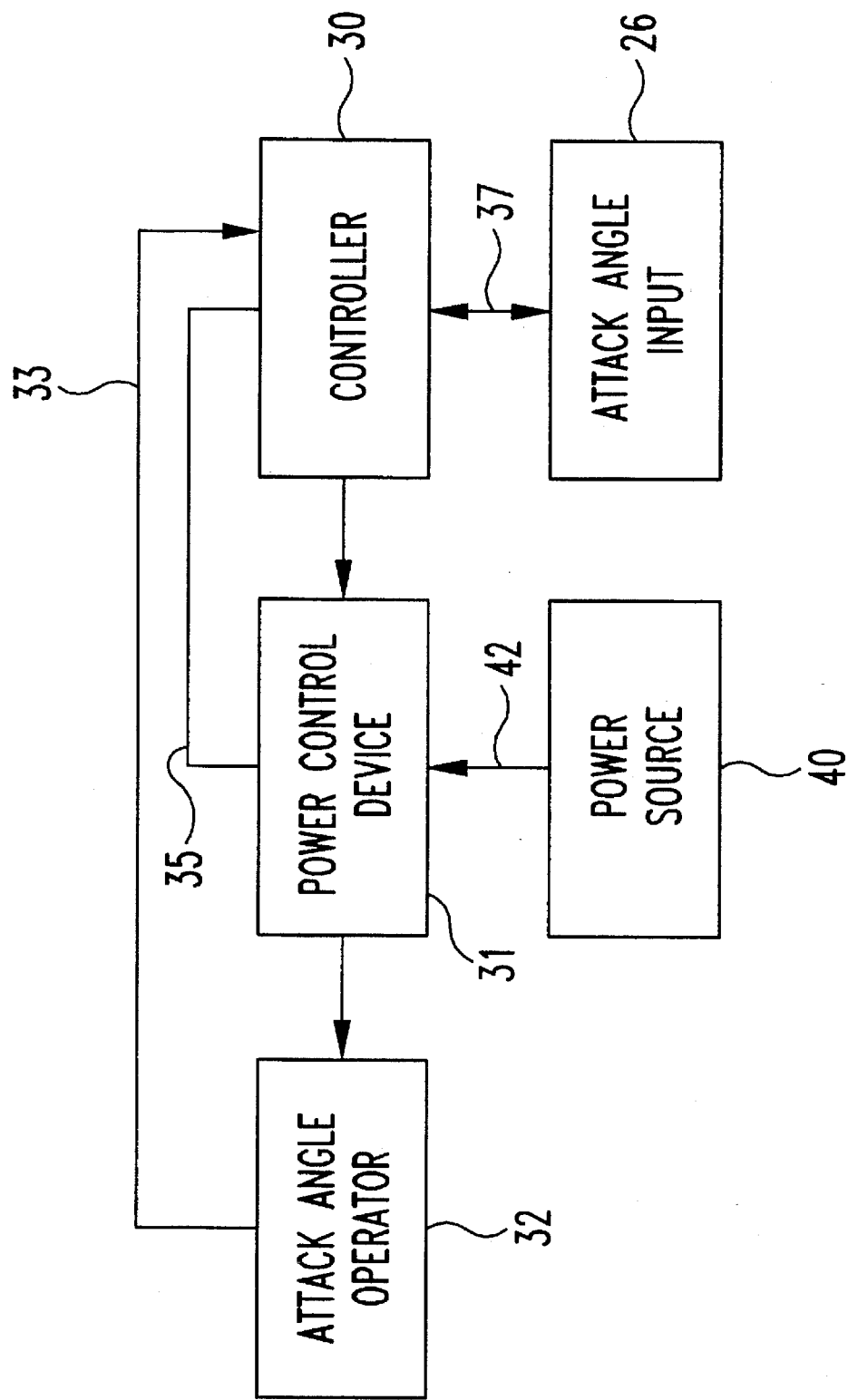
FIG. 1C is a block diagram of a system of the invention for controlling the cutting blade angle.

The improvement comprising the present invention is illustrated by the diagrammatic drawing of FIG. 1B and block diagram of FIG. 1C. As shown in FIG. 1B, the pressure plate and cutting blade assembly 20 includes a blade carrier 23 and pressure plate support 53 mounted to and carried by the blade carrier 23. The blade carrier 23 is pivotally coupled to the carriage 18 by an axle or axles 21. In accordance with the invention, the angle of attack of the blade 16 (illustrated by arrow 17) may be altered by remotely controllable means 32 for rotating the cutting blade 16 with respect to the flitch 14. The means 32 for altering the angle of attack of the cutting blade 16 with respect to the flitch 14 may be a remotely controllable powered operator such as an electric or hydraulic motor, a hydraulic piston cylinder or an equivalent power driven electromechanical actuator. Rotation of the cutting blade 16 with respect to flitch 14, and the resulting alteration in its angle of attack 17 with respect to flitch 14, is effected by controlling the powered operator 32. The means for controlling the powered operator 32 and the position of the cutting blade 16 with respect to flitch 14 includes as shown in FIG. 1C, a power control device 31 between the powered operator 32 and power source 40, a controller 30 and an operator input 26.

In the control system for the powered operator 32, the controller 30 receives an input from the powered operator 32 indicating the position of the cutting blade 16, shown in Figs. 1B and 1C as connection 33. If the position of the cutting blade 16 matches the information that has been received by controller from the operator input 26 over, for example, connection 37, no action is taken and no signal is generated on the interconnection 35 between the controller 30 and a power control device 31. When the operator of the veneer-slicer wishes to change the angle of attack 17 of blade 16 with respect to the flitch 14, for example after slicing operations has dulled the edge of blade 16 or the consistencies of the wood being sliced has changed, the operator of the veneer-slicer inputs the desired angle of attack into the system with the system input 26, and the controller 30 operates the power control device 31 to apply power from the power source 40 to the powered operator 32 to rotate the blade carrier 23 about its axis of rotation 21. When the blade angle signal from the powered operator 32 over connection 33 matches the desired blade angle position, the controller 30 operates a power control device 31 to remove power from the powered operator. The controller 30 can adjust the operation of the carriage 18 to adjust for differences in reciprocation of the carriage 18 that may be due to the new position of the cutting edges of the blade angle 16 and slicing operations can resume. This selection of the power control device 31 and power source 40 depend upon the selection of the powered operator 32 and may include hydraulic flow control valves, electric motor controllers and other means to control the application of hydraulic and electric power to the powered actuator 32. The controller may be any industrial controller or a microprocessor programmed as set forth below.

Figure 2:
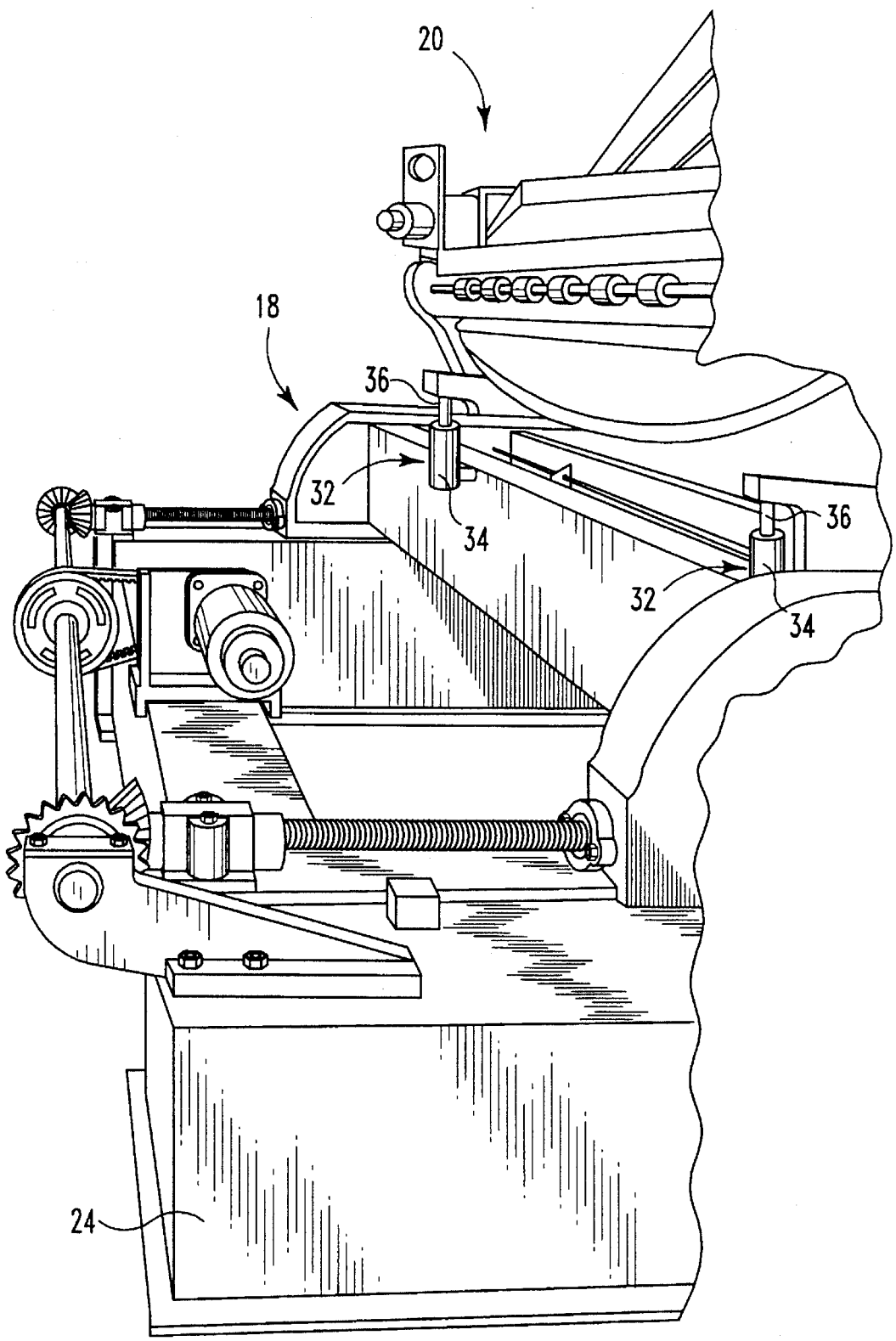
FIG. 2 is a perspective view of the pressure plate and cutting blade assembly and carriage showing the remotely controllable actuator coupled to the carriage and pressure plate and cutting blade assembly.

A preferred embodiment of the present invention, as shown in FIGS. 1 and 2, includes two electrohydraulic actuators 32 coupled to the carriage 18 and pressure plate and cutting blade assembly 20. The actuator 32 is configured to extend and retract and thereby rotate the pressure plate and cutting blade assembly 20 about its axis of rotation 21 relative to the carriage 18. As will be further described below, rotation of the pressure plate and cutting blade assembly 20 changes the angle of attack 17 of a cutting blade 16, coupled to the assembly 20, relative to the flitch 14 to be sliced.

A control console 26 (FIG. 4), an electrical control cabinet 28, and a computer 30, located in the electrical control cabinet 28, are electrically coupled to various components of the machine 10 to control and monitor the operation of the machine 10. Illustratively, FIG. 1 shows the control console 26 and electrical control cabinet 28 positioned on the frame 24. However, it will be appreciated that the console 26 and cabinet 28 can be located remote from the machine 10.

Also included in the machine 10, but not illustrated in the Figures, is a sheet transport assembly. The sheet transport assembly receives the veneer sheets sliced from the flitch 10 and transfers the sheets to a location for pick up and stacking by an operator for later removal from the area.

The flitch support assembly 12 supports a log or log section 14, referred to as a flitch. A flitch support assembly drive means (not shown) reciprocates the flitch support assembly 12 vertically relative to the pressure plate and cutting blade assembly 20. In the system illustrated and described herein, the flitch support assembly 12 reciprocates such that thin veneer sheets can be sliced from the flitch 14 preferably during each downward stroke of the flitch 14. If desired, the system can be designed to slice veneer sheets during each upward stroke of the flitch.

Figure 3:
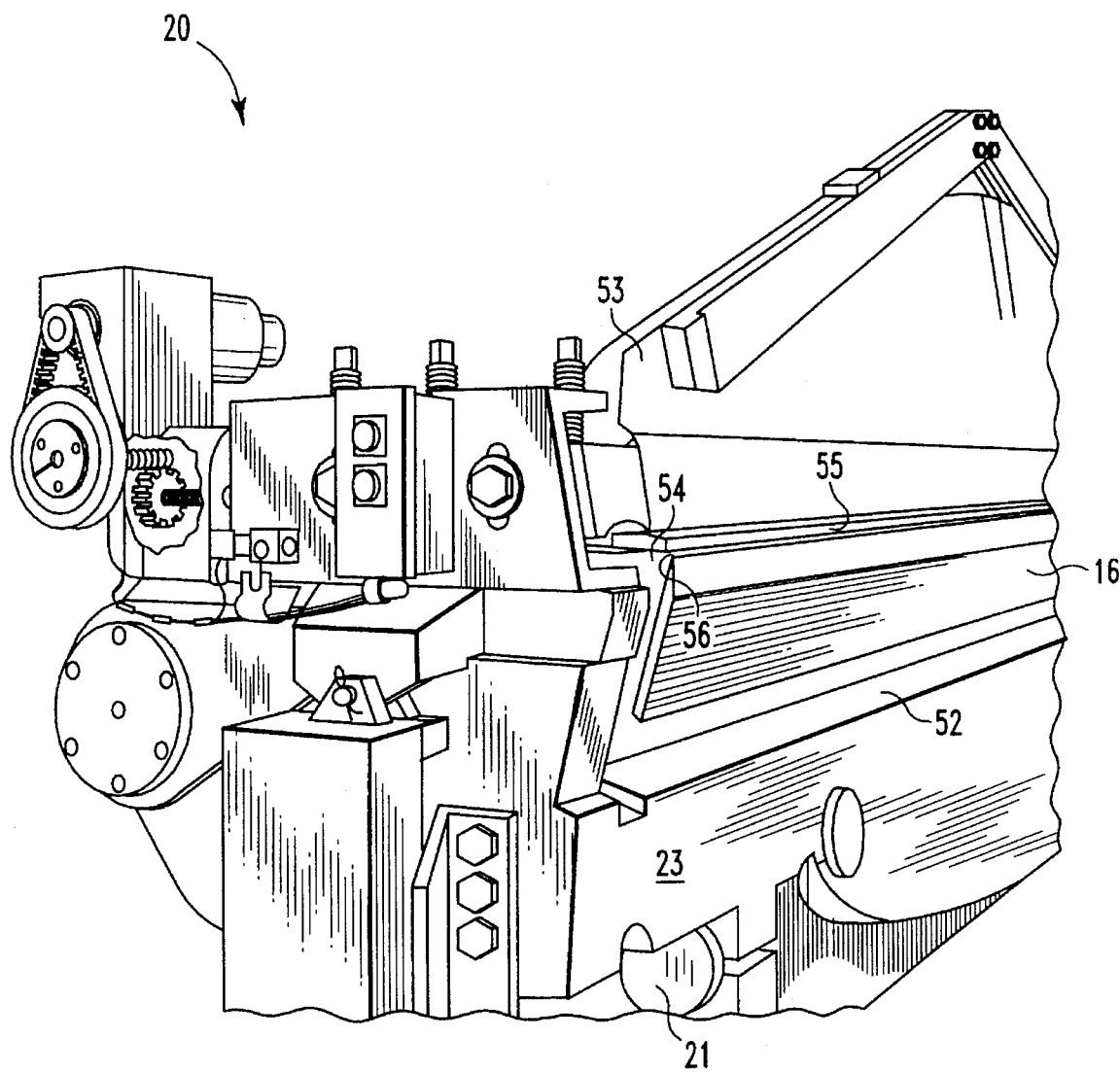
FIG. 3 is a perspective view of a portion of the apparatus of FIG. 1 illustrating the pressure plate and cutting blade assembly.

Supported on carriage 18 for movement therewith is pressure plate and cutting blade assembly 20. As illustrated in FIG. 3, this assembly 20 includes a blade carrier 23, which has a surface 52 to which the cutting blade 16 is mounted. The cutting blade 16 is positioned on the blade carrier 23 to slice a veneer sheet during the downward slicing stroke of the flitch 14. A pressure plate support means 53 includes a pressure plate mounting member 54 which supports a pressure plate 55. As shown in FIG. 3, cutting blade 16 and pressure plate 55 are several feet long (e.g., 8–20 feet) and extend substantially across the width of the machine 10 and define between them a narrow space or blade opening 56. The blade carrier 23 pivots about an axle or pivot pin 21 (FIG. 3).

In the preferred embodiment of the invention, two electrohydraulic actuators 32 extend vertically between, and are coupled to, the carriage 18 and the blade carrier 23, as shown in FIGS. 1 and 2. Each actuator 32 include a cylinder 34 that is rigidly attached to the carriage 18 and a piston 36 adapted for axial movement into and out of the cylinder 34. A distal end 36a of the piston 36 is coupled to the blade carrier 23 by a ball-and-socket coupling 38. Integral to the actuator 32 is a linear displacement transducer that provides a piston position indicating signal to the computer 30 via electrical connection 33. A preferred electrohydraulic actuator is the Parker EH-LDT Actuators with Magnetorestrictive Linear Displacement Transducer manufactured by Parker Fluidpower, 500 S. Wolf Road, Des Plaines, Ill. Although this electrohydraulic actuator is preferred, the powered actuator of this invention may also be motors such as Kollmorgen Corporation's Model No. TT 2950 with appropriate mechanical extension devices.

A fluid source 40 delivers hydraulic fluid under pressure through conduits 42 to the servo valves 31 and actuators 32 to extend or retract the piston 36 in the cylinders 34. Each preferred Parker EH-LDT Actuator includes a servo valve 31 and hydraulic actuator 32, as well the displacement transducer, in a single assembly. As the pistons 36 extend, they lift the blade carrier 23 and rotate the cutting blade 16 about the pivot pin 21. The servo valve 31 is electrically connected to the computer 30 via connection 35. The computer 30 sends control signals to the servo valve 31 via connection 35 to control the position of the piston 36.

Figure 4:
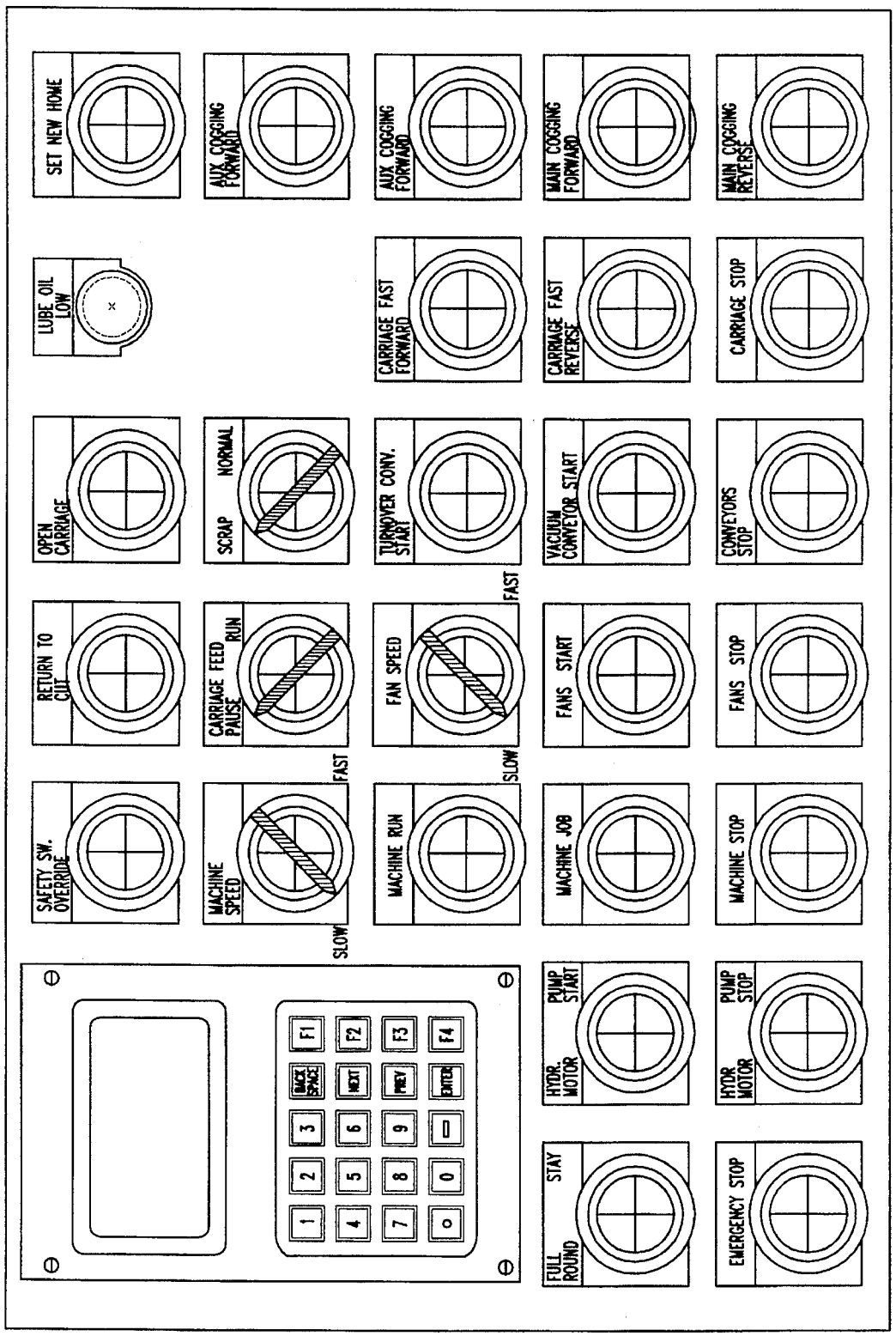
FIG. 4 is a view of the operator control console.

In operation, the linear displacement transducer of the actuator 32 is electrically coupled to the computer 30 via connection 33 and provides a continuous piston position indicating signal to the computer 30. The computer 30 computes the angle of the cutting blade 16 based on the position indicating signal and provides an angle indicating signal to the control console 26 via connection 37 to inform the operator. The operator can change the cutting blade angle by pressing pushbuttons on the control console 26 (FIG. 4). Pressing either an increment or a decrement pushbutton on the operator control console transmits the command signal via connection 37 to the computer 30. The computer 30 compares the present cutting blade angle, based on the position indicating signal, to the cutting blade angle ordered by the command signal. Based on the difference between the angles, the computer 30 sends a control signal via connection 35 to the servo valve 31 to change the delivery of fluid to the actuator 32 to extend or retract the piston 36 in the cylinder 34. The extension or retraction of the piston 36 causes the cutting blade 16 to rotate about the pivot pin 21 and thereby changes the angle of attack.

Advantageously, the present invention allows a machine operator to specify the desired cutting blade angle of attack and the computer 30, and the preferred electrohydraulic actuator 32, with its integral servo valve and linear displacement transducer, cooperate to reposition the cutting blade 16 to reset the angle of attack to conform to the operator's wishes. The machine operator no longer has to turn adjusting screws to reset the angle of attack, but instead pushes pushbuttons on a remote control console 26.

Figure 5A:
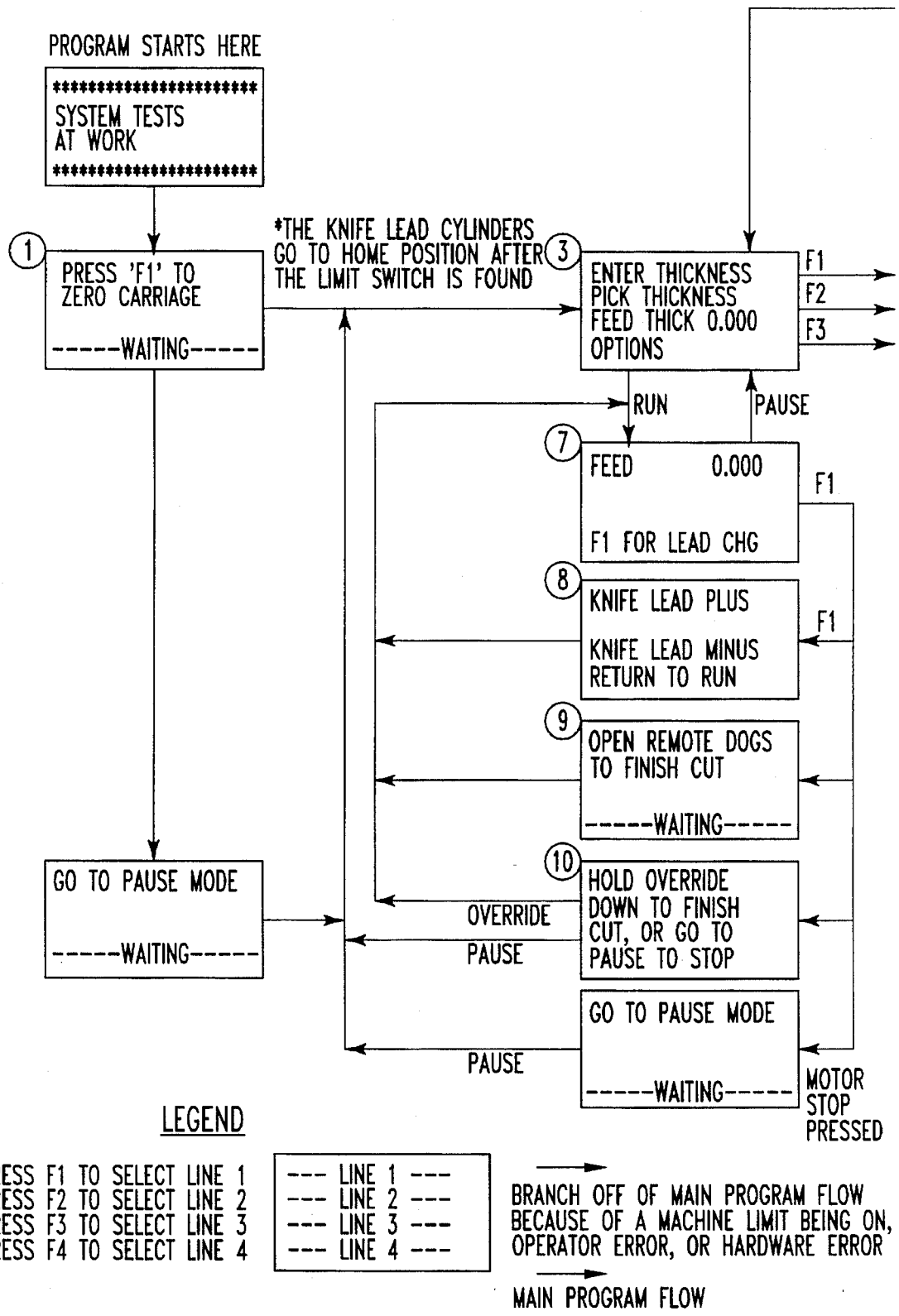
FIGS. 5A–5B is a flow diagram of a controller program for remotely controlling the cutting blade angle in the invention.
Figure 5B:
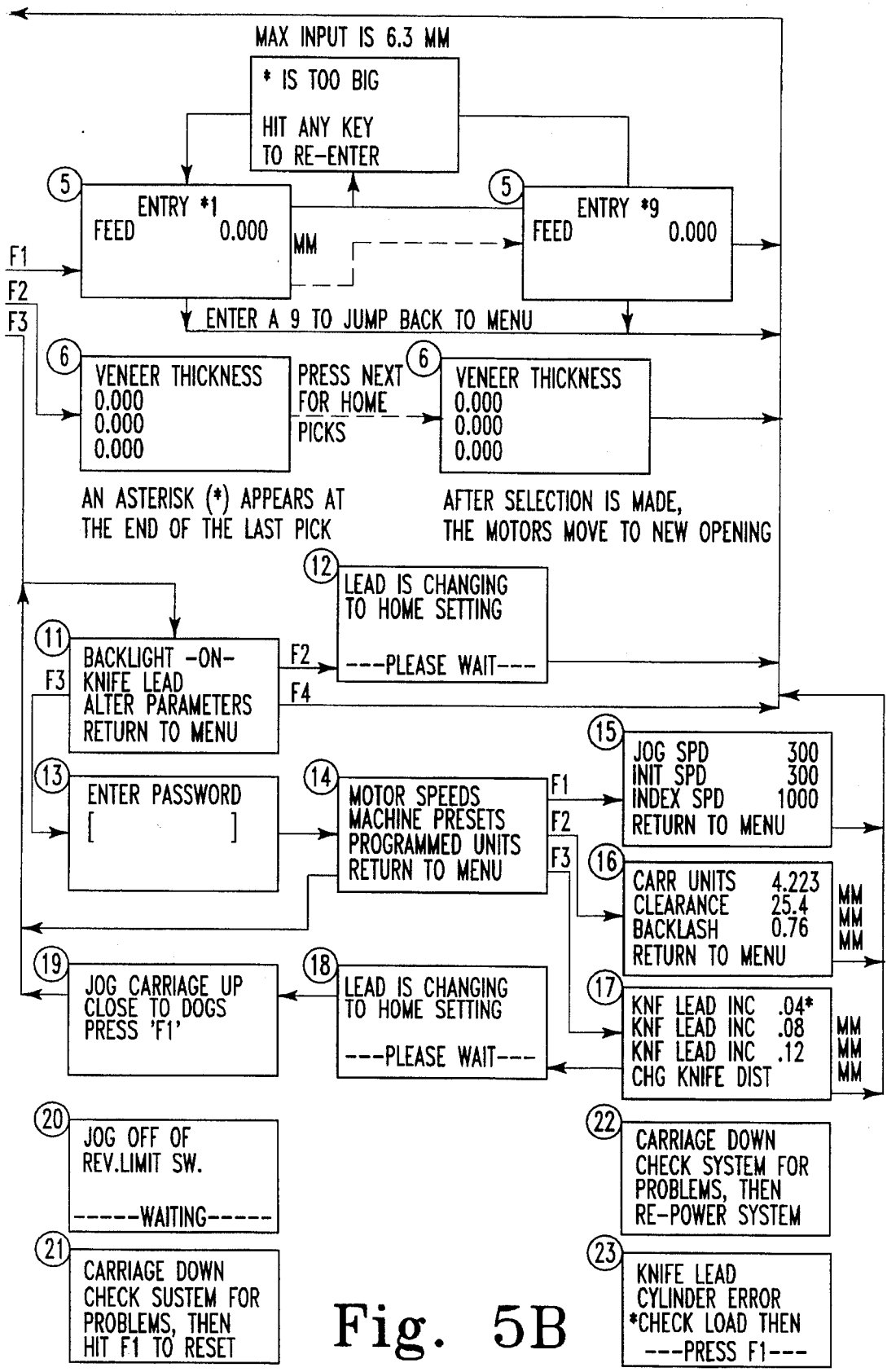

Referring to FIG. 5, when the veneer slicer is initially turned on for the day's work, the computer 30 commands the carriage 18 to return to a "home" position. When the carriage 18 finds a limit switch (not shown), it is at the home position and stops. At that point, the computer 30 prompts the operator to enter a desired veneer thickness. By pressing pushbuttons on the remote control console 26, the operator can optionally select preset thicknesses or enter a specific desired veneer thickness.

The computer 30 also gives the operator the opportunity to verify or change certain machine parameters, such as jog speed, index speed, clearance, backlash, and knife lead increment.

When the operator is satisfied that the thickness and parameters are correct, he can press a "run" pushbutton to set the slicer in motion. As the slicing proceeds, the operator may find it necessary to adjust the lead angle of the knife 16 to correct for dulling of the blade or changes in the consistency of the wood being cut. The operator can change the lead angle by pressing an increment or decrement pushbutton. The computer processes the increment or decrement command and sends a control signal via connection 35 to the servo valve 31 to change the delivery of fluid to the actuator 32 to extend or retract the piston 36 in the cylinder 34 by preset knife lead increment.

Advantageously, a different knife lead angle can be selected at any time during the slicing cycle, but the computer 30 will command the actual change only during a certain preprogrammed point in the operating cycle so that the change does not alter the thickness of a sheet during the slicing part of the cycle.

In addition, when the computer 30 changes the knife lead angle based on an operator command, the computer 30 calculates the distance a new lead angle moves the knife edge toward or away from the flitch 14. The computer 30 adds or subtracts that amount to the carriage feed so that even though the knife lead is adjusted, subsequent sheets will have the same thickness as the previous sheets.

The foregoing discussion has centered on the use of the present invention in combination with a reciprocating-type veneer slicer. It will be appreciated that the invention is equally suitable for use with other slicing machines. Such machines include, but are not limited to, staylog lathes and full round rotary lathes.

Although the invention has been described in detail with reference to certain preferred embodiments, variations, and modifications exist within the scope and spirit of the invention as described and defined in the following claims.

I claim:

1. Veneer-slicing apparatus, comprising:

a flitch table for supporting a flitch to be sliced;

a carriage;

a blade carrier pivotably coupled to the carriage;

first drive means for reciprocating the flitch table and the flitch supported thereon in a first plane, each reciprocation of the flitch table including a slicing stroke and a return stroke;

second drive means for moving the carriage and the cutting blade mounted thereon in a second plane substantially perpendicular to the first plane;

a cutting blade mounted on the blade carrier and having a cutting surface extending along the blade for slicing veneer sheets from the flitch during the slicing stroke of the flitch table; and means for rotating the cutting blade with respect to the flitch table to reposition the cutting surface relative to the flitch, the rotating means including hydraulic piston means for pivoting the blade carrier with respect to the carriage and means for controlling the position of the hydraulic piston means.

2. The apparatus of claim 1, wherein the hydraulic piston means includes a piston coupled to the blade carrier, drive means for extending the piston, and means for providing a signal indicating the position of the piston.

3. The apparatus of claim 2, wherein the controlling means includes means for sending instructions from an operator and computer means for receiving the signal from the providing means and the instructions from the operator console means.

4. The apparatus of claim 3, wherein the computer means includes means for processing the position indicating signal and the operator instructions and means for sending a control signal to the drive means to control the position of the piston.

5. The apparatus of claim 2, wherein the controlling means includes means for receiving and processing the signal from the providing means and means for sending a control signal to the drive means to control the position of the piston.

6. The apparatus of claim 5, wherein the hydraulic piston means includes a hydraulic piston coupled to the blade carrier and carriage, a source of fluid, and means for delivering fluid to the hydraulic piston to actuate the piston.

7. Veneer-slicing apparatus, comprising:
a reciprocating flitch table for moving a flitch to be sliced in a substantially vertical plane, the reciprocation of the flitch table including a slicing stroke and a return stroke;
a reciprocating carriage movable in a substantially horizontal plane, the reciprocation of the carriage including movement in a first direction toward the plane of reciprocation of the flitch table and movement in a second direction opposite to the first direction;
a cutting blade coupled to the carriage, the cutting blade being oriented to present a predetermined angle of attack relative to the flitch to be sliced and positioned to slice a veneer sheet from the flitch during the slicing stroke of the flitch table; and
means for rotating the cutting blade to alter the angle of attack of the cutting blade relative to the flitch, the rotating means including remotely controllable positioning means for rotating the cutting blade with respect to the carriage and means, remote from the veneer-slicing apparatus, for controlling the positioning means.

8. The apparatus of claim 7, wherein the cutting blade includes a blade carrier pivotably coupled to the carriage and the remotely controlled positioning means includes at least one powered actuator coupled to the blade carrier and the carriage and means for supplying power to the at least one actuator to change the position of the blade carrier.

9. The apparatus of claim 8, wherein the controlling means includes first means for providing a signal indicating the position of the powered actuator and means for receiving the signal.

10. The apparatus of claim 9, wherein the controlling means further includes second means for providing a control signal from an operator to the receiving means, the receiving means providing, in response to the signals from the first and second providing means, a signal to a power control device to control the operation of the at least one powered actuator.

11. The apparatus of claim 7, wherein the remotely controlled positioning means includes at least one hydraulically operated piston coupled to the cutting blade and means for changing the position of the at least one piston and the controlling means includes computer means for receiving and processing input signals from an operator and at least one piston position sensor and for providing a control signal to the changing means to direct the positioning of the at least one piston.

12. The apparatus of claim 7, wherein the controlling means includes first means for prompting an operator to input a desired veneer thickness.

13. The apparatus of claim 7, wherein the controlling means includes second means for prompting an operator to input a desired knife lead increment.

14. The apparatus of claim 13, wherein the controlling means includes means for accepting and processing an operator command to change a knife lead angle by the desired knife lead increment.

15. The apparatus of claim 7, wherein the controlling means includes third means for prompting an operator to verify machine parameters.

16. Veneer-slicing apparatus, comprising:
means for supporting a flitch to be sliced;
a pressure plate and cutting blade assembly, the pressure plate and cutting blade assembly including pressure plate means and cutting blade means defining a space therebetween for receipt of veneer sheets sliced from the flitch and means for orienting the cutting blade to present a predetermined angle of attack relative to the flitch to be sliced;
means for changing the predetermined angle of attack of the cutting blade, the changing means being coupled to the cutting blade means and including at least one piston and cylinder actuator and means for controlling the at least one piston and cylinder actuators.

17. The apparatus of claim 16, further comprising carriage means for moving the pressure plate and cutting blade assembly toward the flitch, wherein the cutting blade means includes a blade carrier pivotably coupled to the carriage and the at least one piston and cylinder actuator is coupled to the carriage and the blade carrier.

18. The apparatus of claim 17, wherein the controlling means includes operator console means for providing an operator signal, means for supplying fluid to the at least one piston and cylinder actuator to vary the position of the actuator, sensor means for providing a signal indicating the position of the actuators, means for receiving and processing the signal from the operator console means and the sensor means, and means for providing a control signal to the supplying means to vary the position of the actuators.

19. The apparatus of claim 17, wherein the controlling means includes means for supplying fluid to the at least one piston and cylinder actuator to vary the position of the piston and cylinder actuator and operator console means for initiating a signal to the supplying means to change the position of the at least one piston and cylinder actuator to change the angle of attack of the cutting blade.

20. The apparatus of claim 17, further including means for comparing the signal from the operator console means with a position indicating signal from the at least one piston and cylinder actuator to generate a control signal to the supplying means.

21. In a veneer-slicing apparatus having a reciprocating flitch table for moving a flitch to be sliced in a first plane, the reciprocation of the flitch table including a slicing stroke and a return stroke, a reciprocating carriage movable in a second plane, the second plane being substantially perpendicular to the first plane and the reciprocation of the carriage including movement in a first direction toward the first plane and movement in a second direction opposite to the first direction, and a cutting blade coupled to the carriage, the cutting blade being adjustable to present a variable angle of attack relative to the flitch to be sliced, the cutting blade being positioned on the carriage to slice a veneer sheet from the flitch during the slicing stroke of the flitch table, the improvement comprising:
remotely operable means for rotating the cutting blade to alter the angle of attack of the cutting blade, the remotely operable means including hydraulically operated positioning means, including at least one positionable piston and cylinder assembly coupled to the carriage and the cutting blade, means for controlling a flow of hydraulic fluid to said at least one positionable piston and cylinder assembly, means for providing a signal indicating the position of the at least one piston and cylinder actuator, and means, connected with the signal providing means and with the hydraulic flow controlling means, for generating a representation of the angle of attack of the cutting blade and for operating the hydraulic flow controlling means to adjust the angle of attack of the cutting blade.

22. A veneer-slicing apparatus, comprising:

a flitch table for moving a flitch to be sliced, the movement of the flitch including a slicing stroke and a return stroke;

a cutting blade for slicing veneer sheets from the flitch during the slicing stroke;

means for positioning the cutting blade relative to the flitch to slice veneer sheets from the flitch, the positioning means including means for orienting the cutting blade so that the cutting blade presents a predetermined angle of attack relative to the flitch; and means for changing the predetermined angle of attack, the changing means including at least one electrohydraulic actuator and means for controlling the at least one electrohydraulic actuator.

23. The apparatus of claim 22, further comprising a carriage for moving the cutting blade into position to cut the veneer sheets from the flitch, wherein the positioning means includes a blade carrier attached to the cutting blade and pivotably coupled to the carriage and the at least one electrohydraulic actuator is coupled to the blade carrier to rotate the blade carrier about a pivot axis the angle of attack of the cutting blade.

24. The apparatus of claim 23, wherein the controlling means includes operator console means for providing an operator input signal, sensing means for providing a position indicating signal, and computer means for receiving the operator input signal and the position indicating signal and for generating a signal to control the position of the actuator.

25. A method for adjusting an angle of attack between a cutting blade and reciprocating flitch to be sliced into veneer sheets, wherein the cutting blade is rotated about a pivot axis by a remotely controllable powered actuator, the actuator being coupled to a power source and including an actuator position sensor, the method comprising the steps of:

providing an actuator position indicating signal;

providing an operator command signal; and providing means for processing the position indicating signal and the command signal and for providing a control signal to control the actuator to change the angle of attack of the cutting blade.

26. The method of claim 25, wherein said powered actuator is a hydraulically powered piston and cylinder, and said actuator position indicating signal is generated by a transducer sensing the position of said piston, and said piston position indicating signal and said operator command signal are compared in the processing means to determine an appropriate control signal.

27. The method of claim 26, wherein said control signal operates a servo valve to control the flow of hydraulic fluid to said cylinder to position said piston.

28. A method for adjusting an angle of attack between a cutting blade and a flitch to be sliced into veneer sheets, wherein the cutting blade is positioned relative to a pressure plate and is rotated about a pivot axis by a remotely controllable powered actuator, the actuator being coupled to a power source and including an actuator position sensor, the method comprising the steps of:

providing an actuator position indicating signal;

providing an operator command signal; and providing means for processing the position indicating signal and the command signal and for providing a control signal to control the actuator to rotate the cutting blade and pressure plate to change the angle of attack of the cutting blade relative to the flitch.

\* \* \* \* \*